United States Patent [19]

Helfert et al.

[11] Patent Number: 4,614,604

[45] Date of Patent: Sep. 30, 1986

[54] LUBRICANTS FOR SHAPING POLYVINYL CHLORIDE, WHICH CONTAIN ESTERIFIED OLIGOMERIC POLYHYDRIC ALCOHOLS

[75] Inventors: Herbert Helfert, Frankenthal; Wolf-Dieter Balzer, Ludwigshafen; Guenter Hatzmann, Leimen; Wolfram Dietsche, Frankenthal; Albert Hettche, Hessheim; Stefan Weiss, Neckargemuend, all of Fed. Rep. of Germany

[73] Assignee: BASF Aktiengesellschaft, Rheinland-Pfalz, Fed. Rep. of Germany

[21] Appl. No.: 757,923

[22] Filed: Jul. 22, 1985

Related U.S. Application Data

[63] Continuation of Ser. No. 613,223, Jul. 19, 1984, abandoned, which is a continuation of Ser. No. 370,906, Apr. 22, 1982, abandoned.

[30] Foreign Application Priority Data

May 9, 1981 [DE] Fed. Rep. of Germany ....... 3118417

[51] Int. Cl.$^4$ ........................................... C10M 129/74
[52] U.S. Cl. ............................... 252/56 S; 260/410.6; 260/410.7
[58] Field of Search .................. 252/56 S; 260/410.6, 260/410.7

[56] References Cited

U.S. PATENT DOCUMENTS

| | | | |
|---|---|---|---|
| 3,681,440 | 8/1972 | Gash | 252/56 S |
| 3,691,219 | 9/1972 | Boussely | 252/56 S |
| 3,864,295 | 2/1975 | Boussely | 252/56 S |
| 3,988,330 | 10/1976 | Foulks, Jr. et al. | 252/56 S |
| 4,011,251 | 3/1977 | Tjurin et al. | 260/488 J |

FOREIGN PATENT DOCUMENTS 1292548 10/1972 United Kingdom .

*Primary Examiner*—Jacqueline V. Howard
*Attorney, Agent, or Firm*—Oblon, Fisher, Spivak, McClelland & Maier

[57] ABSTRACT

A lubricant for shaping polyvinyl chloride, which contains esters of oligomers of trihydric, tetrahydric, pentahydric or hexahydric aliphatic alcohols, having 3 or more monomer units, with saturated or unsaturated $C_8$-$C_6$-fatty acids, from 30 to 100% of the alcoholic hydroxyl groups being esterified.

8 Claims, No Drawings

LUBRICANTS FOR SHAPING POLYVINYL CHLORIDE, WHICH CONTAIN ESTERIFIED OLIGOMERIC POLYHYDRIC ALCOHOLS

This application is a continuation of application Ser. No. 613,223, filed July 19, 1984, now abandoned, which is a continuation of Ser. No. 370,906, filed Apr. 22, 1982, now abandoned.

The present invention relates to novel lubricants for shaping polyvinyl chloride (PVC), which contain certain oligomeric polyhydric alcohols esterified with long-chain fatty acids and which in particular exhibit a strong external lubricant action. Shaping includes extrusion, calendering and injection-molding.

For these purposes, esters of long-chain aliphatic carboxylic acids (montan acids) with dihydric or trihydric alcohols (eg. glycol or glycerol) have hitherto been particularly used. These lubricants are disclosed in, for example, German Published Application DAS No. 1,907,768.

The diverse requirements which an effective PVC lubricant must meet may be illustrated by reference to the calendering of rigid PVC.

In some calendering processes (cf., in particular, Kunststoffe 68 (1978), 9), a high-molecular weight emulsion PVC to which relatively large amounts of lubricants (about 3–4 phr, ie. parts per hundred parts of resin) have been added is processed by means of an extruder at below the melting range of the PVC, and the sheeting obtained is fully melted by brief heating to above 200° C. Finally, the sheeting is stretched in order to give it the necessary mechanical strength.

Electron micrographs have shown that, when the PVC is shaped on the calender, the PVC particles are merely held together by a matrix of lubricant and emulsifier. A brief heat shock then fully melts the particles, so that a homogeneous, transparent phase results.

Lubricants used for this purpose were, in particular, the glycol montanates mentioned at the outset; whilst these gave excellent results, they did not represent the ideal in respect of all requirements.

The requirements are as follows:
1. The lubricant must exhibit a certain incompatibility with the PVC, which however must not be excessively marked, since otherwise the matrix, referred to above, of PVC particles, lubricant and emulsifier has insufficient coherence.
2. After the brief exposure to a high temperature, the lubricant/PVC mixture must exhibit sufficient transparency in relation to the thickness of the sheeting (about 40–100 μm), and there must be no adverse effect on the mechanical strength of the sheeting.
3. The lubricant must not form any deposit on the rolls.
4. Hide formation on the calendering rolls must take place without delay, and the product must of course be heat-stable.
5. In particular, the sheeting formed after stretching must not exhibit any holes or streaks and must show sufficiently high gloss. The last-mentioned properties, in particular, have hitherto not been met ideally with montan ester waxes.

A further possible use of external lubricants is in the production of film by extrusion blowing. In this case, the external lubricants are employed in substantially lower concentration.

Essential aspects in assessing the lubricant are, once again, the film quality, such as transparency, gloss, absence of streakiness and surface structure, as well as the extruder machinery data, such as torque etc.

It is an object of the present invention to provide lubricants which as far as possible meet all these requirements and not only a part thereof.

We have found that this object is achieved with the lubricants defined in the claims. The active ingredient in these lubricants comprises oligomers of trihydric, tetrahydric, pentahydric or hexahydric aliphatic alcohols, containing 3 or more monomer units, in which 30–100% of the OH groups are esterified with $C_8$–$C_{36}$-fatty acids.

Examples of monomeric trihydric, tetrahydric, pentahydric and hexahydric alcohols used for the purposes of the invention are glycerol, 1,2,4-trihydroxybutane, pentitols, hexitols, trimethylolpropane and pentaerythritol. Preferably, glycerol, pentaerythritol and trimethylolpropane are used, separately or in a mixture.

The non-esterified oligomers can be obtained in various ways. The alcohols are condensed in a basic medium at an elevated temperature, giving co-condensates, except where only one alcohol is employed, in which case only homologous condensates are obtained. It is however also possible to react a monomeric alcohol, or even an oligomeric alcohol, with an epoxidized polyhydric alcohol, such as glycidol, again giving oligomers, though in this case as mixed blocks.

The oligomers must contain not less than 3, and should preferably contain at most 25, monomer units. Depending on the reaction conditions employed for their preparation, they may have a linear, two-dimensional or three-dimensional structure.

The condensates or adducts are then esterified in a conventional manner with $C_8$–$C_{36}$-aliphatic fatty acids or mixtures of such acids, 30–100%, preferably 50–80%, of the OH groups being converted. Suitable fatty acids are all those falling within the above definition, such as octanoic acid, erucic acid, palmitic acid, stearic acid, oleic acid, lauric acid, montan acid and naturally occurring mixtures such as tallow acids, coconut fatty acid or mixtures of these.

Preferred esters have a linear structure, as defined in claim 2. This structure corresponds to the formula I, as given in claim 2:

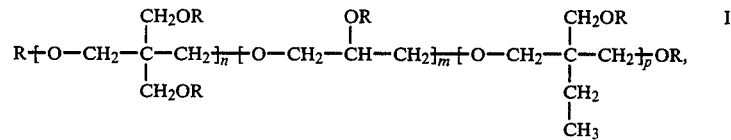

where R is hydrogen and the proportion of

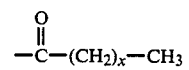

according to the definition given, x is from 6 to 34, n is from 0 to 5, m is from 0 to 10 and p is from 0 to 10, with the proviso that n+m+p≧3.

Accordingly, preferred products are oligomers of glycerol, trimethylolpropane and pentaerythritol, which may be present as mixed oligomers, block oligomers or homooligomers.

Particularly preferred structures, within the scope of the present invention, correspond to the following formulae:

(a) The structure of the formula II

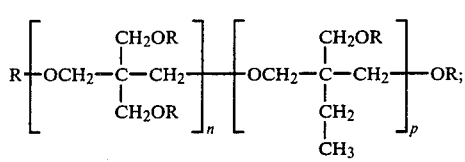

here m is 0 so that the products are esters of cocondensates of trimethylolpropane and pentaerythritol, n is from 2 to 4 and p is from 1 to 3.

R is in this case preferably

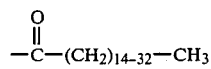

and hydrogen, with the acyl group accounting for from 50 to 80%.

(b) The structure of the formula III

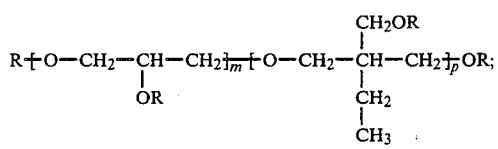

here n is 0, m and p are as defined in formula I and R is preferably as defined for formula II.

(c) A further important structure is that of the formula IV

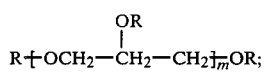

here n and p are 0 and m is from 3 to 10, ie. the product is an oligoglycerol ester.

Here again R is preferably as defined for formula II.

Adduct formation of glycidol with glycerol, trimethylolpropane and/or pentaerythritol or their oligomers gives structures corresponding to formula I, but with the individual monomer units arranged blockwise in the molecule. This method of preparation does not affect the lubricant properties.

It is important that the minimum number of monomer units in the molecule should be 3 and that the preferred maximum number of 25 units should not be exceeded, and also that the degree of esterification should be as defined. It is moreover advantageous if substantially no residual carboxylic acid is detectable in the mixture.

German Published Application DAS No. 2,511,807 describes the preparation of glycerol esters or polyglycerol esters of aliphatic monocarboxylic acids of 5 to 8 carbon atoms. These products are useful only as plasticizers for PVC.

Belgian Pat. No. 750,055, similarly to German Published Application DAS No. 1,907,768 mentioned at the outset, describes montan acid esters of monomeric glycerol as lubricants. These products however tend to stick prematurely to the rolls, ie. they have an insufficient lubricant action.

The products to be used according to the invention are particularly suitable for the production of very thin sheeting having high gloss and good strength.

The products can be processed easily on extruders and calenders, do not stick, and give hole-free and streak-free sheeting, without forming a deposit in the extruder or on the rolls.

The Examples which follow illustrate the invention.

EXAMPLES

(A) General method

The preparation of the polyhydroxy compounds does not form part of the invention. The compounds are prepared by conventional methods. Thus, for example, the polyhydroxy compounds shown in Table 1 are prepared from trimethylolpropane and glycidol (2,3-epoxypropanol), using a basic catalyst, eg. KOH, at 90°–130° C., preferably 100°–110° C., under a nitrogen atmosphere. In the case of products 16 and 17, a mixture of 1 mole of trimethylolpropane and 1 mole of pentaerythritol is reacted with 3.5 moles of glycidol in the presence of 0.5% by weight of KOH at 100°–116° C.

The polyglycerols shown in Table 2 are prepared either from glycerol+n moles of glycidol or by homocondensation of glycerol in the presence of a catalyst (eg. sodium acetate).

The polyhydroxy compounds shown in Table 3 are in turn obtained by condensing trimethylolpropane or trimethylolpropane/pentaerythritol mixtures in the presence of catalysts.

The OH number is determined experimentally and from this the OH equivalent weight is calculated, which in turn can be used to calculate the amount of monobasic fatty acids required to give the desired percentage esterification.

The polyhydroxy compounds are condensed with the fatty acids, eg. stearic acid, at an elevated temperature, under a nitrogen atmosphere, using a catalyst such as dibutyl-tin maleate or dibutyl-tin dilaurate.

After condensation, the ester is usually filtered, but not bleached. However, where necessary, it can be bleached with 1–5% by weight of bleaching earth, though if the reaction is carried out carefully the products obtained mostly have a satisfactory color and do not require further bleaching.

Examples 1–4 describe the preparation of some esters characterized in the tables.

(B) Special products

EXAMPLE 1

Preparation of ester No. 8 of Table 1

1,100 g (4 moles) of stearic acid, 300 g (5 equivalents) of an adduct of trimethylolpropane with 3 moles of glycidol, having a calculated equivalent weight of 590 and a found equivalent weight of 600, and 1.4 g of dibutyl-tin maleate are condensed for 21 hours at 185° C. in a 2 liter three-necked stirred flask fitted with a distillation bridge, under a nitrogen atmosphere and with stirring.

Yield: 1,326 g. Distillate: 69 g.

The product is filtered off at 90° C. on a suction filter. A clear, white product is obtained. The product has the following properties: melting point 44°–46° C., iodine color number 5; OH number 49.5; acid number 11; saponification number 172.5.

EXAMPLE 2

Preparation of ester No. 19 of Table 2

2,310 g (8.4 moles) of stearic acid, 576 g (12 equivalents) of triglycerol (prepared from glycerol and 2 moles of glycidol) and 2.9 g of dibutyl-tin maleate are condensed for 27 hours at 188° C. in a 4 liter three-necked stirred flask equipped with a distillation bridge, under a nitrogen atmosphere and with stirring.

Yield: 2,728 g. Distillate: 150 g.

After filtration, a pale solid product is obtained.

The product has the following properties: melting point 52°–53.5° C.; iodine color number 7; OH number 72.5; acid number 0.3; saponification number 175.0.

EXAMPLE 3

Preparation of ester No. 27 of Table 2

1,960 g (7 moles) of oleic acid (white Siegert olein), 520 g (10 equivalents) of polyglycerol prepared by self-condensation of glycerol and having an equivalent weight of 52, and 2.5 g of dibutyl-tin maleate are condensed for 20 hours at 201° C. in a 4 liter three-necked stirred flask equipped with a distillation bridge, under a nitrogen atmosphere and with stirring.

Yield: 2,345 g. Distillate 133 g.

The product is filtered through a suction filter (filter K3). A pale clear liquid is obtained.

The product has the following properties: iodine color number 9; OH number 75.0; acid number 0.3; saponification number 172.0.

EXAMPLE 4

Preparation of ester No. 38 from Table 3

2,200 g (8 moles) of stearic acid and 432 g (10 equivalents) of a polycondensate of trimethylolpropane and pentaerythritol in the molar ratio of 1:4 are condensed for 24 hours at 185° C. in a 4 liter three-necked stirred flask equipped with a distillation bridge, under a nitrogen atmosphere and with stirring.

Yield: 2,477 g. Distillate 137 g.

The product has the following properties: melting point 57°–58° C.; iodine color number 6; OH number 47.0; acid number 0.7; saponification number 185.5.

The other esters, shown in the tables, are prepared in a similar manner.

TABLE 1

Esters of stearic acid (sa) and polyhydroxy compounds obtained from trimethylolpropane (TMP) and/or pentaerythritol (penta) reacted with n moles of glycidol

| Ester | Starting materials | Equivalent ratio | Reaction conditions | OH number | Acid number | Saponification number | Iodine color number | Melting point |
|---|---|---|---|---|---|---|---|---|
| 1 | (TMP + 1 glycidol) + sa⊕ | 1:0.9 | 23 hours at 185° C. | 22.5 | 1.2 | 180.0 | 4–5 | 38–39°. C. |
| 2 | " | 1:0.8 | 23 hours at 185° C. | 41.0 | 0.9 | 176.0 | 4–5 | 38–39.5° C. |
| 3 | " | 1:0.6 | 23 hours at 185° C. | 102.5 | 0.2 | 165.0 | 5 | 36–36.5° C. |
| 4 | " | 1:0.9 | 21 hours at 185° C. | 26.5 | 5.1 | 177.0 | 4–5 | 44–45° C. |
| 5 | " | 1:0.8 | 21 hours at 185° C. | 45.0 | 3.4 | 173.0 | 4–5 | 42–43° C. |
| 6 | " | 1:0.6 | 21 hours at 185° C. | 99.5 | 0.5 | 163.5 | 7 | 40–41° C. |
| 7 | " | 1:1.0 | 21 hours at 185° C. | 18.0 | 6.6 | 179.0 | 30 | 34–45° C. |
| 8 | " | 1:0.8 | 21 hours at 185° C. | 49.5 | 1.1 | 172.5 | 5 | 44–46° C. |
| 9 | " | 1:0.5 | 21 hours at 185° C. | 147.5 | 0.1 | 150.5 | 9 | 34–38° C. |
| 10 | (TMP + 4 glycidol) + sa | 1:0.9 | 21 hours at 185° C. | 34.5 | 62 | 175.0 | 4–5 | 46.5–47° C. |
| 11 | " | 1:0.8 | 21 hours at 185° C. | 50.5 | 4.8 | 171.0 | 4–5 | 46–46.5° C. |
| 12 | " | 1:0.6 | 21 hours at 185° C. | 103 | 0.6 | 160.0 | 5 | 44–44.5° C. |
| 13 | (TMP + 6 glycidol) + sa | 1:1.0 | 21 hours at 185° C. | 23.0 | 7.5 | 176.7 | 15 | 34–41° C. |
| 14 | " | 1:0.8 | 21 hours at 185° C. | 70.0 | 9.0 | 166.9 | 5 | 43–45° C. |
| 15 | " | 1:0.5 | 21 hours at 185° C. | 149.5 | 0.4 | 148.5 | 4 | 38–41° C. |
| 16 | (TMP-penta + 3.5 glycidol) + sa | 1:0.8 | 21 hours at 185° C. | 55.5 | 9.0 | 174.0 | 4 | 45–46° C. |
| 17 | " | 1:0.6 | 21 hours at 185° C. | 107.5 | 0.5 | 162.5 | 4 | 44–45° C. |

⊕Stearic acid

TABLE 2

Esters of fatty acids and polyglycerols

| Ester | Starting materials | Equivalent ratio | Reaction conditions | OH number | Acid number | Saponification number | Iodine color number | Melting point |
|---|---|---|---|---|---|---|---|---|
| 18 | Polyglycerol (n = 3) + sa | 1:0.8 | 21 hours at 185° C. | 53.5 | 5.1 | 182.0 | 4–5 | 52.5–53.5° C. |
| 19 | " | 1:0.7 | 27 hours at 185° C. | 72.5 | 0.3 | 175.0 | 7 | 52–53.5° C. |
| 20 | " | 1:0.6 | 22 hours at 185° C. | 102.0 | 0.5 | 168.5 | 4–5 | 54–54.5° C. |
| 21 | Polyglycerol (n = 6) + sa | 1:0.9 | 22 hours at 185° C. | 47.5 | 18.3 | 177.5 | 4–5 | 51–52° C. |
| 22 | " | 1:0.8 | 22 hours at 185° C. | 61.5 | 15.8 | 173.0 | 4–5 | 54–55° C. |
| 23 | " | 1:0.7 | 22 hours at 185° C. | 99.5 | 0.8 | 162.5 | 4–5 | 54–55° C. |
| 24 | Polyglycerol (n = 3–4) + sa | 1:0.9 | 24 hours at 187–197° C | 43.5 | 8.6 | 179.5 | 5 | 53–55° C. |
| 25 | " | 1:0.8 | 24 hours at 185–190° C. | 63.0 | 6.0 | 176.5 | 6 | 53–55° C. |
| 26 | " | 1:0.7 | 19 hours at 185° C. | 84.0 | 1.9 | 172.5 | 6 | 53–55° C. |
| 27 | Polyglycerol (n = 3–4) + oleic acid | 1:0.7 | 20 hours at 201° C. | 75.0 | 0.3 | 172.0 | 9 | liquid |
| 28 | Polyglycerol (n = 3–4) + lauric acid | 1:0.7 | 24 hours at 202–210° C | 104.0 | 1.1 | 223.0 | 6 | liquid |
| 29 | Polyglycerol (n = 3–4) + behenic acid | 1:0.7 | 20 hours at 201° C. | 64.0 | 0.5 | 148.0 | 7 | 67–69° C. |
| 30 | Polyglycerol (n = 3–4) + 2-ethylhexanoic acid | 1:0.7 | 24 hours at 190–215° C. | 139.5 | 4.2 | 273.5 | 9 | liquid |
| 31 | Polyglycerol (n = 3–4) + | 1:0.7 | 21 hours at 202° C. | 73.0 | 0.2 | 176.0 | 12 | pasty |

TABLE 2-continued

| | | Esters of fatty acids and polyglycerols | | | | | | |
|---|---|---|---|---|---|---|---|---|
| Ester | Starting materials | Equivalent ratio | Reaction conditions | OH number | Acid number | Saponification number | Iodine color number | Melting point |
| | tallow acid | | | | | | | |

TABLE 3

Esters of stearic acid and polycondensates of trimethylolpropane (TMP) and trimethylolpropane/pentaerythritol (penta) mixtures in the stated molar ratio

| Ester | Starting materials | Equivalent ratio | Reaction conditions | OH number | Acid number | Saponification number | Iodine color number | Melting point |
|---|---|---|---|---|---|---|---|---|
| 32 | Poly-TMP (equiv. wt. 56.9) + sa | 1:1 | 14 hours at 198° C. | 32.5 | 0.5 | 184.0 | 7 | 42–44° C. |
| 33 | Poly-TMP (equiv. wt. 51.3) + sa | 1:1 | 24 hours at 201° C. | 8.0 | 5.5 | 191.0 | 40–50 | 45–46° C. |
| 34 | Poly-TMP (equiv. wt. 48.1) + sa | 1:1 | 27 hours at 201° C. | 28.0 | 28.0 | 191.0 | 3.5 | 40–51° C. |
| 35 | Poly-TMP-penta = 1:1 (equiv. wt. 46.0) + sa | 1:0.9 | 21 hours at 185° C. | 33.5 | 6.7 | 188.0 | 7 | 53–55° C. |
| 36 | Poly-TMP-penta = 1:1 (equiv. wt. 46.0) + sa | 1:0.7 | 21 hours at 185° C. | 75.0 | 0.8 | 180.0 | 7 | 39–42° C. |
| 37 | Poly-TMP-penta = 1:4 (equiv. wt. 43.2) + sa | 1:0.9 | 24 hours at 185° C. | 26.5 | 1.2 | 187.0 | 6 | 60–61.5° C. |
| 38 | Poly-TMP-penta = 1:4 (equiv. wt. 43.2) + sa | 1:0.8 | 24 hours at 185° C. | 47.0 | 0.7 | 185.5 | 6 | 57–58° C. |
| 39 | Poly-TMP-penta = 1:4 (equiv. wt. 43.2) + sa | 1:0.7 | 24 hours at 185° C. | 80.5 | 0.5 | 182.5 | 7 | 48–50° C. |
| 40 | Poly-TMP-penta = 1:1 (equiv. wt. 43.4) + sa | 1:1 | 19 hours at 200° C. | 13.5 | 4.0 | 192.5 | 6 | 59.5–63.5° |

(C) Use Examples

Because of the relatively broad range of applications, the materials can be tested in various ways. Some examples, given below, demonstrate the various test procedures used for different PVC formulations.

EXAMPLE 5

Test on ester No. 29 of Table 2

The external lubricant action was determined by measuring the plasticizing properties in comparison with a montan ester wax. The plastographic torque-measuring instrument used is the Plasti-Corder PLE 330 from Brabender OHG.

The base mixture used in the test is composed of 100 parts of suspension PVC (K value 60), 2 parts of Ba/Cd stabilizer, 0.5 part of a co-stabilizer based on an epoxy-oil and 0.5 part of an internal lubricant (glycerol monooleate). 0.4, 0.8 or 1.2 phr of the ester to be tested are added to this base mixture, and the composition is introduced into the kneading chamber of the plastograph.

The plastograph has the following characteristics: charge 30 g; bath temperature 160° C.; speed of revolution (constant) 40 rpm; weight load 5 kg.

The Ba/Cd stablized base mixture (ie. without lubricant) shows a maximum torque of 71 Nm, a final torque of 44 Nm, a plasticizing time of 45 seconds and a material temperature of 196° C.

In comparison, ester No. 29 reduces the maximum torque to 57 Nm on addition of 0.4 phr, 50 Nm on addition of 0.8 phr and 39 Nm on addition of 1.2 phr.

The final torque is also very markedly reduced; thus it is 35 Nm on addition of 0.4 phr, 35.4 Nm on addition of 0.8 phr and 34 Nm on addition of 1.2 phr.

In the same concentration series, the plasticizing time is lengthened, being 1.5 minutes on addition of 0.4 phr, 4 minutes on addition of 0.8 phr and 6.5 minutes on addition of 1.2 phr.

In the above concentration series, the material temperature is lowered from 196° C. through 194° C. to 191° C.

All these results indicate that ester No. 29 can be regarded as an effective external lubricant.

Other esters according to the invention, tested under these conditions, give the results shown in Table 4.

TABLE 4

| Example (from Tables 1–3) | Color number | Melting point | Amount of lubricant added | Plastographic mixture (rigid PVC, Ba/Cd-stabilized) | | | |
|---|---|---|---|---|---|---|---|
| | | | | Maximum torque | Final torque | Plasticizing time | Material temperature |
| Base mixture | — | — | — | 71 Nm | 44 Nm | 45 seconds | 196° C. |
| Montan ester wax | 20–25 | 78° C. | 0.4 phr | 60 Nm | 35 Nm | 1 minute | 194° C. |
| | | | 0.8 phr | 50 Nm | 35 Nm | 2 minutes | 194° C. |
| | | | 1.2 phr | 44 Nm | 34.5 Nm | 3.5 minutes | 193° C. |
| Ester No. 2 | 4–5 | 38–40° C. | 0.4 phr | 62 Nm | 35 Nm | 1 minute | 194° C. |
| | | | 0.8 phr | 56 Nm | 35 Nm | 1.75 minutes | 194° C. |
| | | | 1.2 phr | 49 Nm | 34.5 Nm | 2.75 minutes | 192° C. |
| Ester No. 8 | 5 | 44–46° C. | 0.4 phr | 61 Nm | 35.5 Nm | 1.5 minutes | 196° C. |
| | | | 0.8 phr | 51 Nm | 35 Nm | 2.5 minutes | 196° C. |
| | | | 1.2 phr | 38.5 Nm | 34 Nm | 9 minutes | 190° C. |
| Ester No. 14 | 5 | 43–45° C. | 0.4 phr | 63 Nm | 35 Nm | 1 minute | 196° C. |
| | | | 0.8 phr | 44 Nm | 34.5 Nm | 6.5 minutes | 196° C. |
| | | | 1.2 phr | 37.5 Nm | 34 Nm | 10 minutes | 190° C. |
| Ester No. 16 | 4 | 45–46° C. | 0.4 phr | 65 Nm | 36 Nm | 1.25 minutes | 197° C. |

TABLE 4-continued

| Example (from Tables 1-3) | Color number | Melting point | Amount of lubricant added | Plastographic mixture (rigid PVC, Ba/Cd-stabilized) | | | |
|---|---|---|---|---|---|---|---|
| | | | | Maximum torque | Final torque | Plasticizing time | Material temperature |
| | | | 0.8 phr | 53 Nm | 35.5 Nm | 3.5 minutes | 196° C. |
| | | | 1.2 phr | 43 Nm | 35 Nm | 6 minutes | 192° C. |
| Ester No. 22 | 4–5 | 54–55° C. | 0.4 phr | 56 Nm | 33.5 Nm | 1.5 minutes | 195° C. |
| | | | 0.8 phr | 39.5 Nm | 33.5 Nm | 6.5 minutes | 194° C. |
| | | | 1.2 phr | 36 Nm | 33 Nm | 7.5 minutes | 190° C. |
| Ester No. 27 | 9 | liquid | 0.4 phr | 63 Nm | 34.5 Nm | 1 minute | 196° C. |
| | | | 0.8 phr | 58 Nm | 34 Nm | 1.5 minutes | 194° C. |
| | | | 1.2 phr | 51 Nm | 33.5 Nm | 2.75 minutes | 193° C. |
| Ester No. 29 | 7 | 67–69° C. | 0.4 phr | 57.5 Nm | 35 Nm | 1.5 minutes | 196° C. |
| | | | 0.8 phr | 50 Nm | 34.5 Nm | 4 minutes | 194° C. |
| | | | 1.2 phr | 39 Nm | 34 Nm | 6.5 minutes | 191° C. |
| Ester No. 34 | 30 | 40–51° C. | 0.4 phr | 62 Nm | Not measured | 0.75 minute | 195° C. |
| | | | 0.8 phr | 59 Nm | | 1.25 minutes | 195° C. |
| | | | 1.2 phr | 46 Nm | | 27.5 minutes | 193° C. |
| Ester No. 40 | 6 | 59.5–63.5° C. | 0.4 phr | 65 Nm | Not measured | 1 minute | 196° C. |
| | | | 0.8 phr | 47 Nm | | 4 minutes | 195° C. |
| | | | 1.2 phr | 39.5 Nm | | 9 minutes | 190° C. |

EXAMPLE 6

A further test was carried out on a rigid PVC formulation, the base mixture comprising 100 parts of emulsion PVC, of K value 78, and 0.35 part of diphenylurea.

Before carrying out a larger-scale experiment on a calender resembling that used for industrial production, the following exploratory preliminary experiments are carried out:

3.5 phr. of ester No. 8 of Table 1 are added to the above base mixture, and the batch is milled and converted to 1 mm thick compression-molded sheets. The transparency of these is mesaured (for example with an apparatus which measures light transmission), and compared with that of a sheet prepared using an equal amount of montan ester wax. In the present Example, the sheet has a transparency of 56% whilst that containing the montan ester wax has a transparency of 58%, ie. the compatibility of the ester according to the invention is slightly less than that of the montan ester wax.

In a further test, a plastographic measurement is carried out on a formulation for sheeting, resembling that which would be used in industrial practice, the amount of lubricant added being 3.5 phr. The change of maximum torque due to the change of viscosity, and the plasticizing times are also measured.

Ester No. 8 gives a maximum torque of 56 Nm (against 57.5 Nm in the case of the montan ester wax) and a plasticizing time of 85 seconds (against 60 seconds in the case of the montan ester wax).

Both results, ie. the transparencies and the plasticizing characteristics, indicate that ester No. 8 is a somewhat more powerful external lubricant than the montan ester waxes.

However, the deciding test is the processing of the lubricant on an industrial calendering line, where the overall behavior is tested. Table 5 shows test results, obtained analogously to Example 6, for a range of esters. The middle column shows the nature of the calendered sheeting obtained from the production trial. Ester No. 8 gives a smaller number of streaks than does the montan ester wax, ie. no weld lines are formed; the gloss and transparency obtained are also good.

TABLE 5

| | (Tested in rigid PVC stabilized with diphenylthiourea) | | | | |
|---|---|---|---|---|---|
| Example (from Tables 1–3) | Transparency of a 1 mm thick compression-molded sheet | Nature of the calendered sheeting | Plastographic measurements | | |
| | | | Amount of lubricant added | Maximum torque | Plasticizing time |
| Montan ester wax | 58% | Good, small number of streaks, glossy | 3.5 phr | 57.5 Nm | 1 minute |
| Ester No. 6 | 56% | Good, no streaks, glossy | 3.5 phr | 60 Nm | 45 seconds |
| Ester No. 8 | 56.5% | Good, no streaks, glossy | 3.5 phr | 56 Nm | 85 seconds |
| Ester No. 29 | 52% | Good, no streaks, somewhat cloudier, glossy | 3.5 phr | 56 Nm | 90 seconds |
| Ester No. 40 | 51% | Good, no streaks, somewhat cloudier, glossy | 3.5 phr | 61 Nm | 50 seconds |

We claim:

1. A lubricant for shaping polyvinylchloride having an active ingredient which consists of esters having the following formula:

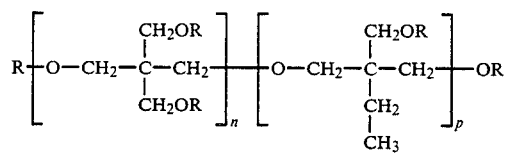

wherein n is from about 2 to 4 and p is from 1 to about 3; and

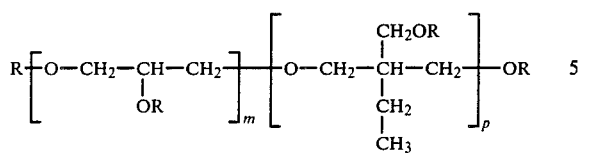

wherein p is 1 and m is 1, 4 or 6; R is hydrogen or the fatty acid radical:

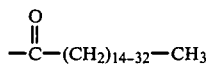

and wherein the degree of esterification is from 50 to 80%, and the molecule contains the monomer units in blocks or in random distribution.

2. The lubricant according to claim 1, wherein said fatty acid radical is a radical selected from the group consisting of stearic acid, palmitic acid, lauric acid, tallow acids and coconut fatty acid.

3. A lubricant for shaping polyvinylchloride having an active ingredient which consists of esters having the formula:

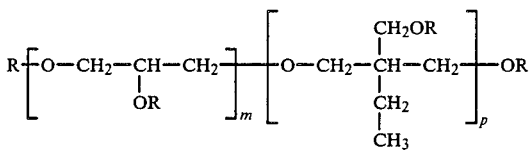

wherein p is 1 and m is 1, 4 or 6; R is hydrogen or a fatty acid radical selected from the group consisting of stearic acid, palmitic acid, lauric acid, tallow acids and coconut fatty acid, and wherein the degree of esterification is 50 to 80%, and the molecule contains the monomer units in blocks or in random distribution.

4. A lubricant for shaping polyvinylchloride having an active ingredient which consists of esters having the formula:

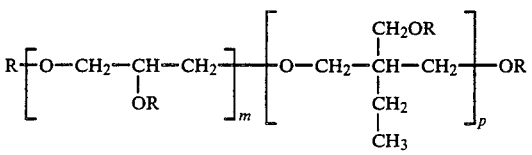

wherein p is 1 and m is 1, 4 or 6; and R is a stearic acid radical.

5. A method of shaping polyvinylchloride, which comprises:
(a) adding to said polyvinylchloride an effective amount of a lubricant having an active ingredient which consists of esters having the formulas:

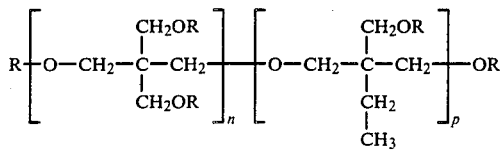

wherein n is from about 2 to 4 and p is from 1 to about 3; and

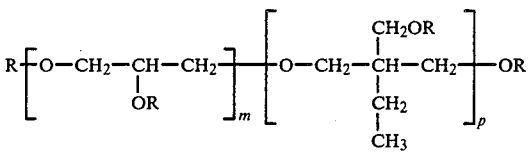

wherein p is 1 and m is 1, 4 or 6; R is hydrogen or the fatty acid radical:

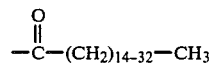

and wherein the degree of esterification is from 50 to 80%, and the molecule contains the monomer units in blocks or in random distribution; and then
(b) processing said lubricated polyvinylchloride.

6. The method according to claim 5, wherein said fatty acid radical is a radical selected from the group consisting of stearic acid, palmitic acid, lauric acid, tallow acids and coconut fatty acid.

7. A method for shaping polyvinylchloride, which comprises:
(a) adding to said polyvinylchloride an effective amount of a lubricant having an active ingredient which consists of esters having the formula:

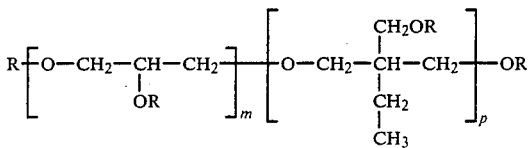

wherein p is 1 and m is 1, 4 or 6; R is hydrogen or a fatty acid radical selected from the group consisting of stearic acid, palmitic acid, lauric acid, tallow acids and coconut fatty acid, and wherein the degree of esterification is from 50 to 80%, and the molecule contains the monomer units in blocks or in random distribution.

8. A method of shaping polyvinylchloride, which comprises:
(a) adding to said polyvinylchloride an effective amount of a lubricant having an active ingredient which consists of esters having the formula:

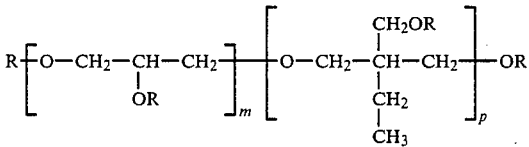

wherein p is 1 and m is 1, 4 or 6; and R is a stearic acid radical.

* * * * *